United States Patent Office

Re. 26,833
Reissued Mar. 24, 1970

26,833

METHOD FOR TREATING COCCIDIOSIS WITH QUINAZOLINONES

Emanuel Waletzky, Princeton, and Gerald Berkelhammer and Sidney Kantor, Trenton, N.J., assignors to American Cyanamid Company, Stamford, Conn., a corporation of Maine No Drawing. Original No. 3,320,124, dated May 16, 1967, Ser. No. 383,910, July 20, 1964. Application for reissue May 15, 1968, Ser. No. 731,358
Int. Cl. A61k *27/00*
U.S. Cl. 424—251 20 Claims

Matter enclosed in heavy brackets [ ] appears in the original patent but forms no part of this reissue specification; matter printed in italics indicates the additions made by reissue.

*ABSTRACT OF THE DISCLOSURE*

*A method of controlling coccidiosis in animals comprising orally administering to domestic animals an edible carrier containing an effective amount of an anti-coccidial of the formula:*

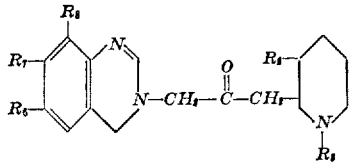

*wherein each of $R_6$, $R_7$ and $R_8$ is individually selected from the group consisting of hydrogen, halogen, nitro, lower alkyl, phenyl, and lower alkoxy and $R_6$ and $R_7$ or $R_7$ and $R_8$, taken together, may form a benzo moiety.*

This invention relates to a method of preventing or controlling coccidiosis in domesticated animals such as poultry, turkeys, sheep, goats, cattle, rabbits, etc. More particularly, the present invention resides in the discovery that certain quinazolinone compounds, as described more particularly hereinafter, are highly effective anticoccidials at extremely low dosages.

A broad class of quinazolinones are described in the Baker et al. Patent No. 2,694,711 and are known to be physiologically active as antimalarial agents.

We have discovered that certain of these quinazolinones are effective anticoccidials at very low concentrations. This is surprising because it is known that little or no correlation exists between useful antimalarial activity and useful anticoccidial activity. So far as we are aware no useful anticoccidial is a useful antimalarial and no useful antimalarial is a useful anticoccidial; therefore, it is surprising to discover that a limited number of the Baker et al. quinazolinones are exceptionally active at conspicuouly low concentrations, i.e., 0.5 to 10 p.p.m. Such exceptional activity is required for practicality as an anticoccidial as the synthesis of this class of compounds is complex and expensive. Furthermore, we have found a limited number of the Baker et al. quinazolinones to be highly effective against a wide variety of coccidial species including E. tenella, E. necatrix, E. acervulina, E. meleagrimitis, E. maxima and E. brunetti.

The active anticoccidial agents of the present invention are compounds represented by the general formula:

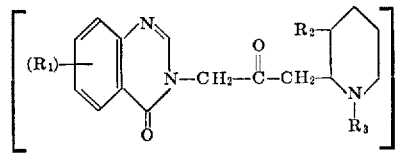

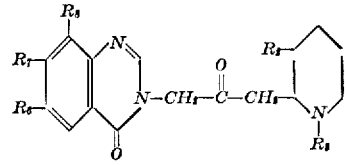

*wherein each of $R_6$, $R_7$ and $R_8$ is individually selected from the group consisting of hydrogen, halogen, nitro, lower alkyl, phenyl and lower alkoxy, and $R_6$ and $R_7$ or $R_7$ and $R_8$, taken together, may form a benzo moiety.* [wherein $R_1$ is a member of the group consisting of hydrogen, halogen, nitro, benzo, lower alkyl, phenyl and lower alkoxy,] $R_2$ is a member of the group consisting of hydroxy, acetoxy, and lower alkoxy and $R_3$ is a member of the group consisting of hydrogen and lower alkenoxycarbonyl. Suitable lower alkyl and lower alkoxy radicals are those having from 1–6 carbon atoms. [The substituents represented by the symbol $R_1$ may be one or more of the 6, 7, or 8 positions only of the quinazolinone nucleus.]

Also included with the scope of the present invention are the salts of these compounds with either one or two equivalents of a physiologically acceptable acid.

Although for the past decades coccidiosis has been recognized as one of the most important diseases confronting the poultry industry, nevertheless, heretofore, no entirely satisfactory method of control of the disease has been provided. This is evidenced by the fact that losses in the United States due to poultry coccidia are estimated to exceed 38 million dollars annually. Coccidiosis is also an important disease of sheep, goats, cattle, rabbits, etc.

Many know anticoccidials have shown high activity against E. tenella and E. necatrix, but low activity against other important species of coccidia, such as E. acervulina, E. meleagrimitis, E. maxima and E. brunetti. Furthermore, the commercially available anticoccidials require relatively high concentrations in the animal ration, i.e., 50 and frequently more parts per million, whereas the compounds of the present invention will effectively control coccidiosis at 0.5 to 10 p.p.m.

The present invention involves the method of preventing, controlling or treating coccidiosis involving orally administering to animals either prophylactically or therapeutically an effective amount, i.e., in the range of 0.5 to 10 p.p.m. of one of the compounds of the above formula. Generally it has been found that between about 0.5 and 10 p.p.m. of one of the active anticoccidials of the present invention in the diet of the animal or in the drinking water is highly effective in preventing or controlling or treating coccidiosis.

When using the compounds of the invention for the prevention or control of coccidiosis, the active coccidiostat is normally first compounded into an animal feed supplement. These supplements, which contain relatively large percentage of the coccidiostat, are then uniformly distributed in the finished animal feed either directly or after an intermediate processing step. The feed supplements are prepared by adding the subject compounds to a suitable carrier and mixing for sufficient time to give substantially uniform dispersion of the coccidiostat in the carrier. These supplements ordinarily contain about 0.1–1.0% and preferably from about 0.3–0.6% of active ingredient. The carrier or diluent is a solid edible material that is inert with respect to the subject compounds and that may be administered with safety to the animals to be treated. Typical of such carriers are distillers grains, corn meal, ground oyster shells, attapulgus clay, molasses solubles, antibiotic mycelia, soya grits, soyabean feed, soyabean meal, crushed limestone and the like. For the preparation of these supplements, fats, oils, antioxidants, and surface active agents can be employed.

These highly active anticoccidials may be combined with other anticoccidials such as the sulfonamides, or with feed additives, such as antibiotics, vitamins, etc.

The invention will be described in greater detail in conjunction with the following specific examples.

Example 1.—E. tenella—Prophylactic

In the following tests, 1125 Rhode Island Red male x Barred Rock female cross cockerels, 7 days old and of approximately equal size and weight, were divided into eleven groups comprising from 10 to 279 chicks per group. These groups were placed in separate cages with wire floors. A broiler feed diet of the formulation set forth below and having graded levels of test medicament intimately blended therewith was prepared and administered to the various groups. The formulation used was as follows:

FORMULATION

| | Lbs./ton |
|---|---|
| Corn yellow, fine ground | 1200 |
| Soybean, fine ground | 400 |
| Corn gluten meal | 100 |
| Fish meal | 100 |
| Alfalfa meal | 40 |
| Distillers solubles | 50 |
| Mico mix 8009 Limecrest+$MnSO_4$ | 40 |
| Bone meal (steamed) | 30 |
| NaCl | 10 |
| Choline chloride (25%) | 2 |
| Fortafeed (2–49C) | 2 |
| 2 g. riboflavin. | |
| 4 g. pantothenic/lb. | |
| 9 g. niacin. | |
| 10 g. choline. | |
| Vitamin A+D, dry | 2 |
| 2,000 $\mu$/g. $D_3$ | |
| 10,000 $\mu$/g. A. | |
| Profactor —B, 10 mg./ton. | |

The medicaments employed in the instant tests were 4(3H)-quinazolinone, 6,8-dichloro-3-[3-(3-hydroxy-2-piperidyl)-acetonyl]-, hydrochloride; 4(3H)-quinazolinone, 6-phenyl-3-[3-(3-hydroxy-2-piperidyl)acetonyl]-, dihydrochloride and 4(3H)-quinazolinone, 7-bromo-6-chloro-3-[3-(3-hydroxy-2-piperidyl)acetonyl], hydrobromide.

The medicated and unmedicated diets were presented to the chicks and the chicks were permitted to feed and drink ad libitum from two days prior until 7 days following the oral inoculation with sporulated oocysts of Eimeria tenella. The number of oocysts inocculated directly into the crops of all chicks in the test was sufficient to produce 85–100% mortality in the untreated controls. The quantity necessary to produce this mortality rate was determined prior to the time of inoculation by giving graded quantities of oocysts to comparable birds. Seven days following inoculation the test was terminated and the mortality rate recorded for each group.

The results obtained are provided in Table I below where it can be seen that as little as 0.5 part per million of 4(3H)-quinazolinone, 6,8-dichloro-3-[3-(3-hydroxy-2-piperidyl)acetonyl]-hydrochloride reduced the mortality rate in chicks infected with the organism E. tenella and 5 p.p.m. afforded complete protection against the organism. It may also be noted that as little as 2 p.p.m. of 4(3H)-quinazolinone, 7-bromo-6-chloro-3-[3-(3-hydroxy-2-piperdyl)acetonyl]-hydrobromide and 2.5 p.p.m. of 4(3H)-quinazolinone, 6-phenyl-3-[3-(3-hydroxy-2-piperidyl)acetonyl]-dihydrochloride reduced the mortality rate of chicks infested with E. tenella and 4 and 10 p.p.m. respectively produced 100% survival. Although the formulation given above was used in the above tests, other standard animal feed formulations can be used with similar success.

TABLE I.—ANTICCOCIDIAL—PROPHYLACTIC—E. TENELLA

| Compound | Parts per million in diet | Number of birds treated | Percent survival |
|---|---|---|---|
| 4(3H)-quinazolinone,6,8-dichloro-3-[3-(3-hydroxy-2-piperidyl)acetonyl]-, hydrochloride. | 0 | 279 | 8 |
| | 0.5 | 20 | 40 |
| | 1 | 60 | 78 |
| | 1.25 | 30 | 87 |
| | 1.5 | 50 | 94 |
| | 2 | 140 | 98 |
| | 5 | 66 | 100 |
| 4(3H)-quinazolinone,6-phenyl-3-[3-(3-hydroxy-2-piperidyl)acetonyl]-, dihydrochloride. | 0 | 70 | 10 |
| | 2.5 | 30 | 40 |
| | 5 | 30 | 87 |
| | 10 | 10 | 100 |
| 4(3H)-quinazolinone,7-bromo-6-chloro-3-[3-(3-hydroxy-2 piperidyl)-acetonyl]-,hydrobromide. | 0 | 80 | 13 |
| | 2 | 70 | 87 |
| | 3 | 90 | 100 |
| | 4 | 100 | 100 |

Example 2.—E. tenella—Therapeutic

Seven-day-old Rhode Island Red male x Barred Rock female cross cockerels of substantially similar size and weight were separated into groups of 20, 40, and 50 birds. The birds in each group were orally inoculated with a sufficient number of sporulated oocysts of E. tenella to produce 85–100% mortality in untreated controls. As in Example 1, the oocyst quantity was determined prior to test inoculation. Following inoculation the groups were separately caged in units with wire floors beneath which were placed white papers to catch the droppings and make daily visual examination thereof convenient. For the first three days following inoculation, all groups were fed ad libitum, a broiler feed diet of the formulation given in Example 1 with no medication added. At 72 hours after inoculation, shortly before blood appeared in the droppings, 1.5, 2.0, and 0.0 p.p.m. of 4(3H)-quinazolinone, 6,8-dichloro-3-[3-(3-hydroxy-2-piperidyl)acetonyl] hydrochloride were thoroughly mixed with the feed formulation and presented to the groups of 20, 40, and 50 birds, respectively. Medication was continued for four days and then the test was terminated and the number of survivors in each group counted and recorded.

Further, employing the above procedure but administering the drug in 2000 ml. of drinking water instead of in the feed produced results similar to those obtained with medicated feed.

The results appear in Table II below where it can be seen that only 2.0% of the birds receiving unmedicated diet survived, whereas 80% of those receiving the diet containing 2 p.p.m. of the medicament survived. With water medication where only 25% of the unmedicated birds survived, 100% of the birds medicated with 2 p.p.m. survived. The therapeutic effect of the medicament against E. tenella is, therefore, apparent.

TABLE II.—E. TENELLA—THERAPEUTIC ACTIVITY

| Compound | Parts per million | Number birds treated | Percent survival |
|---|---|---|---|
| Feed medication: 4(3H)-quinazolinone,6,8-dichloro-3-[3,(3-hydroxy-2-piperidyl)acetonyl]-, hydrochloride. | 2 | 40 | 80 |
| | 1.5 | 20 | 40 |
| | 0 | 50 | 2 |
| | Inoculated | | |
| Water medication: 4(3H)-quinazolinone,6,8-dichloro-3-[3-(3-hydroxy-2-piperidyl)acetonyl]-, hydrobromide. | 2 | 20 | 100 |
| | 1 | 20 | 90 |
| | 0 | 20 | 25 |
| | Uninoculated | | |
| | 0 | 20 | 100 |

vidually weighed and returned to their cages. A broiler feed diet of the formulation set forth in Example 1, but having graded levels of medicament intimately dispersed therein, was administered to the several groups of birds for the entire duration of the test. Two days following presentation of the test diets, all birds were orally inoculated with a sufficient number of sporulated oocysts of E. necatrix to produce severe intestinal lesions and 80% mortality in the untreated control group. As in previous examples, the number of oocysts required to produce the desired extent of infection was determined prior to the time of inoculation with comparable birds. Seven days after inoculation the test was terminated. The number of survivors in each test group was recorded, each bird was individually weighed and the average percent weight gain for each group calculated and recorded. Following weighing, all birds were necropsied and the number in each group with reduced intestinal lesions determined by examination of the intestinal tracts. Criteria for activity were percent survival, the number of birds with markedly reduced lesions in the small intestine (fewer than 100 pinpont lesions localized immediately around the yolk stalk) and weight gains made relative to the uninfected unmedicated controls. Lesions in the untreated controls were so abundant and extensive as to be uncountable and produced a very severe hemorrhagic enteritis.

From Table III below it is evident that as little as 1.0 p.p.m. of these compounds, when administered prophylactically, will effectively control E. necatrix, the causative agent for intestinal coccidiosis in chicks.

TABLE III.—NECATRIX—PROPHYLACTIC

| Compound | Parts per million in diet | Number birds treated | Percent survival | Number with reduced lesions | Avg. percent wt. gains |
|---|---|---|---|---|---|
| Uninfected | 0 | 20 | 100 | | 112 |
| Infected | 0 | 20 | 20 | 0 | |
| 4(3H)-quinazolinone, 6,8-dichloro-3-[3-(hydroxy-2-piperidyl)acetonyl]-, hydrochloride. | 1 | 20 | 55 | 0 | 39 |
| | 1.5 | 20 | 90 | 5 | 100 |
| | 2.25 | 20 | 100 | 15 | 110 |
| 4(3H)-quinazolinone, 6,7-dichloro-3-[3-(3-hydroxy-2-piperidyl)acetonyl]-, hydrobromide. | 1 | 20 | 85 | 1 | 69 |
| | 1.5 | 20 | 90 | 3 | 104 |
| | 2.25 | 20 | 100 | 19 | 116 |
| 4(3H)-quinazolinone, 6-chloro-3-[3-(3-hydroxy-2-piperidyl)acetonyl]-, hydrobromide. | 1 | 20 | 90 | 0 | 61 |
| | 1.5 | 20 | 100 | 11 | 110 |
| | 2.25 | 20 | 100 | 19 | 105 |
| Uninfected | 0 | 40 | 100 | | 131 |
| Infected | 0 | 40 | 20 | 0 | |
| 4(3H)-quinazolinone, 7,8-dichloro-3-[3-(3-hydroxy-2-piperidyl)acetonyl]-, hydrobromide. | 4 | 20 | 95 | 9 | 122 |
| | 5 | 40 | 97 | 31 | 118 |
| | 6 | 20 | 100 | 18 | 119 |

Example 3.—E. necatrix—Prophylactic

To determine the anticoccidial activity of 4(3H)-quinazolinone, 6,8 - dichloro-3-[3-(3-hydroxy-2-piperidyl)acetonyl]-hydrochloride; 4(3H)-quinazolinone, 6,7-dichloro-3 - [3-(3-hydroxy-2-piperidyl)acetonyl], hydrobromide; 4(3H) - quinazolinone, 6-chloro-3-[3-(3-hydroxy-2-piperidyl)acetonyl]-, hydrobromide; and 4(3H)-quinazolinone, 7,8 - dichloro - 3-[3-(3-hydroxy-2-piperidyl)acetonyl]-, hydrobromide, especially as it is related to the percent survival, the reduction of intestinal lesions, and the percent weight gained by chicks infected with sporulated oocysts of Eimeria necatrix, 380 Rhode Island Red male x Barred Rock female cross cockerels, seven days old, were randomly divided into 13 groups of 20 birds and 3 groups of 40 birds each. The birds in each group were indi- Example 4.—E. maxima—Prophylactic To determine the effectiveness of the compounds against the infective organism E. maxima, which is responsive for one type of intestinal coccidiosis in chickens, 140 Rhode Island Red male x Barred Rock female cross cockerels were randomly divided into three equal groups. The chicks in all groups were individually weighed and the groups placed in separate cages with wire floors. A broiler feed diet of the formulation described in Example 1 and having intimately dispersed therein graded levels of 4(3H)-quinazolinone, 6,8-dichloro-3[3-(3-hydroxy - 2-piperidyl)acetonyl]-, hydrochloride and 4(3H)-quinazolinone, 6,7 - dichloro - 3[3-(3-hydroxy-2-piperidyl)acetonyl]-, hydrobromide were provided for the various groups. The chicks were permitted to feed ad libitum throughout the entire test. Two days after presentation of the test feeds all chicks were inoculated with approximately 150,000 sporulated oocysts of the organism E. maxima. Ten days after inoculation the chicks were removed from their cages, weighed, the weights recorded, and the test was terminated.

In a similar test with 100 chicks divided into 5 groups of 20 birds each, all chicks were inoculated with 40,000 sporulated oocysts after 2 days of feeding graded levels of 4(3H) - quinazolinone, 7-bromo-6-chloro-3-[3-(3-hydroxy-2-piperidyl)acetonyl]-, hydrobromide.

The results are tabulated in Table IV below from which it is evident that the test compounds were effective in controlling E. maxima at a concentration in the feed of as little as 1 or 2 p.p.m.

TABLE IV.—E. MAXIMA—PROPHYLACTIC

| Compound | Parts per million in diet | Number birds treated | Percent survival | Grams gained per bird 10 days |
|---|---|---|---|---|
| Uninfected | 0 | 20 | 100 | 124 |
| Infected | 0 | 20 | 95 | 90 |
| 4(3H)-quinazolinone, 6, 8-dichloro-3-[3-(3-hydroxy-2-piperidyl)acetonyl]-, hydrochloride. | 1 | 20 | 100 | 103 |
| | 1.5 | 20 | 100 | 110 |
| | 2.25 | 20 | 100 | 108 |
| 4(3H)-quinazolinone, 6, 7-dichloro-3-[3-(3-hydroxy-2-piperidyl)acetonyl]-, hydrobromide. | 1 | 20 | 100 | 105 |
| | 1.5 | 20 | 100 | 109 |
| Uninfected | 0 | 20 | 100 | 184 |
| Infected | 0 | 20 | 100 | 128 |
| 4(3H)-quinazolinone, 7-bromo-6-chloro-3-[3-(3-hydroxy-2-piperidyl)-acetonyl]-, hydrobromide. | 2 | 20 | 100 | 159 |
| | 3 | 20 | 100 | 187 |
| | 4 | 20 | 100 | 186 |

Example 5.—E. acervulina—Prophylactic

In determining the efficacy of the compounds against the infective organism E. acervulina (one of the etiological agents causing intestinal coccidiosis in chickens), 200 Rhode Island Red male x Barred Rock female cross cockerels, 7 days old, were randomly divided into 10 groups each comprising 20 chicks. These groups were caged in separate units and given free access to feed and water. The diet employed was a broiler feed of the formulation given in Example 1 to which had been added graded levels (from 0 to 3.37 p.p.m.) of 4(3H)-quinazolinone, 6,8-dichloro - 3-[3-(3-hydroxy - 2 - piperidyl)acetonyl]-, hydrochloride, and 0 to 1.5 p.p.m. of 4(3H)-quinazolinone, 6,7-dichloro - 3-[3-(3-hydroxy - 2-piperidyl)acetonyl]-, hydrobromide and 4(3H)-quinazolinone, 6-chloro-3-[3-(3-hydroxy-2-piperidyl)-acetonyl]-, hydrobromide. Two days after presentation of the prescribed diets to the various groups, all chicks were orally inoculated with about 600,000 sporulated oocysts of E. acervulina. The inoculated birds were returned to their cages and the diet was continued for 10 days until the experiment was terminated. On termination, all birds were removed from their cages and weighed, and the weights were recorded.

In a similar test with 130 chicks divided into groups of 20 to 40 chicks each, all chicks were inoculated with 700,000 sporulated oocysts after 2 days of feeding graded levels of 4(3H)-quinazolinone, 7-bromo-6-chloro-3-[3-(3-hydroxy-2-piperidyl)acetonyl]- hydrobromide.

The results of the test indicate that as little as 1 p.p.m. of the quinazolinones tested furnished substantial protection for the birds against the organism E. acervulina. The results of the test recorded in Table V above.

TABLE V.—E. ACERVULINA—A—PHOPHYLACTIC

| Compound | Parts per million in diet | Number birds treated | Avg. percent weight gain of uninfected |
|---|---|---|---|
| Uninfected | 0 | 20 | 100 |
| Infected | 0 | 20 | 70 |
| 4(3H)-quinazolinone,6,8 di chloro-3-[3-(3-hydroxy-2-piperidyl)acetonyl]-,hydrochloride. | 1 | 20 | 76 |
| | 1.5 | 20 | 78 |
| | 2.25 | 20 | 86 |
| | 3.37 | 20 | 92 |
| 4(3H) quinazolinone,6,7-dichloro-3-[3 (3 hydroxy-2-piperidyl)acetonyl]-,hydrobromide. | 1 | 20 | 75 |
| | 1.5 | 20 | 93 |
| 4(3H)-quinazolinone,6-chloro-3-[3-(3-hydroxy-2-piperidyl)-acetonyl]-,hydrobromide. | 1 | 20 | 91 |
| | 1.5 | 20 | 94 |
| Uninfected | 0 | 40 | 100 |
| Infected | 0 | 40 | 72 |
| 4(3H)-quinazolinone,7-bromo-6-chloro-3-[3-(3-hydroxy-2-piperidyl)-acetonyl]-,hydrobromide. | 3 | 30 | 97 |
| | 4 | 20 | 102 |

Example 6.—E. brunetti—Prophylactic

In determining the efficacy of the quinazolinones' invention against the infective organism E. brunetti, 100 Rhode Island Red male x Barred Rock female cross cockerels, 7 days old, were randomly divided into 5 groups comprising 20 chicks. These groups were caged in separate units and given free access to feed and water. The diet employed was a broiler feed of the formulation given in Example 1 to which had been added graded levels of 4(3H)-quinazolinone, 6,7-dichloro-3-[3-(3-hydroxy-2-piperidyl)acetonyl]- hydrobromide. Two days after presentation of the prescribed diet to the various groups, all chicks were orally inoculated with about 140,000 sporulated oocysts of E. brunetti. The inoculated birds were returned to their cages and the diet was continued for 10 days until the experiment was terminated. On termination, all birds were removed from their cages and weighed, and the weights were recorded.

The results of the test indicate that as little as 1 p.p.m. of the quinazolinone tested furnished substantial protection for the birds against the organism E. brunetti. The results of the test are recorded in Table VI below.

TABLE VI.—E. BRUNETTI—PROPHYLACTIC

| Compound | Parts per million in diet | Grams gained per bird, 10 days |
|---|---|---|
| Uninfected | 0 | 88.5 |
| Infected | 0 | 73.0 |
| 4(3H)-quinazolinone,6,7-dichloro-3-[3-(3-hydroxy-2-piperidyl)acetonyl]-,hydrobromide. | 0 | 78.3 |
| | 1.5 | 79.8 |
| | 2.25 | 87.5 |

Example 7

Employing the procedure, formulation and using the test organism, E. tenella, as in Example 1, graded levels of the following compounds

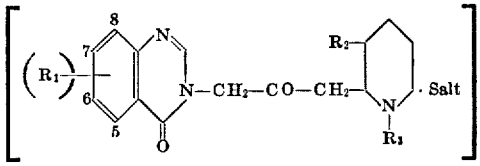

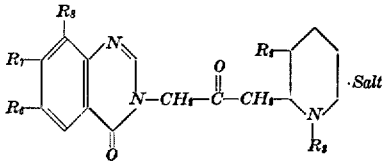

were administered in the diet and the minimum level of compound necessary to afford protection against mortality of chickens due to the organism determined. The results obtained in these tests are provided in Table VII below.

TABLE VII

Anticoccidial activity against the ineffective organism E. tenella of compounds of the general formula:

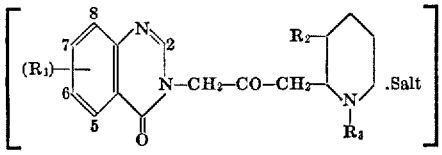

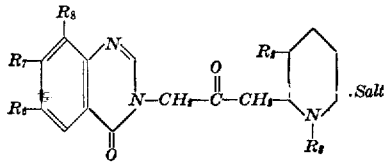

| $R_6$ | $R_7$ | $R_8$ | $R_2$ | $R_3$ | Salt | Parts per million in diet |
|---|---|---|---|---|---|---|
| | | | OH | H | 2HCl | 10 |
| F | | | OH | H | HBr | 10 |
| Cl | | | OH | H | | 1 |
| Cl | | | OH | H | HBr | 2 |
| Cl | | | OH | H | Citrate | 3 |
| Br | | | OH | H | HCl | 2 |
| $CH_3O$ | | | OH | H | | 10 |
| $NO_2$ | | | OH | H | HCl | 10 |
| Phenyl | | | OH | H | 2HCl | 10 |
| | Cl | | OH | H | 2HCl | 2 |
| | Br | | OH | H | 2HCl | 10 |
| | | Cl | OH | H | HBr | 10 |
| Cl | Cl | | OH | H | HBr | 1 |
| Br | Br | | OH | H | HBr | 3 |
| Cl | Br | | OH | H | HBr | 3 |
| Br | Cl | | OH | H | HBr | 2 |
| $CH_3$ | Cl | | OH | H | 2HCl | 5 |
| $CH_3O$ | Cl | | OH | H | 2HCl | 5 |
| $CH_3$ | $CH_3$ | | OH | H | 2HCl | 10 |
| Cl | | Cl | OH | H | 2HCl | 1 |
| Cl | | Cl | OH | H | HCl | 1 |
| Cl | | Cl | OH | H | HBr | 1 |
| Br | | Br | OH | H | 2HCl | 2 |
| I | | I | OH | H | HBr | 10 |
| Cl | | Br | OH | H | HBr | 3 |
| Br | | Cl | OH | H | HBr | 3 |
| | Cl | Cl | OH | H | HBr | 4 |
| Cl | Cl | Cl | OH | H | HBr | 4 |
| Cl | Cl | | $CH_3O$ | H | HCl | 10 |
| Cl | Cl | | $CH_3O$ | $CH_2=CH$ $CH_2-O-CO$ | | 10 |
| benzo | | | OH | H | 2HCl | 10 |
| C | Cl | | O ‖ $O-CCH_3$ | H | | 10 |
| Cl | F | | OH | H | HBr | 2 |

[$R_1$ with — equals H.]
$R_6$, $R_7$ and $R_8$ with "—" equal H.

Example 8.—E. meleagrimitis—Prophylactic

In determining the efficacy of the quinazolinone compounds against the infective organism E. meleagrimitis 29 broad breasted white male turkey poults, 3 weeks old, were randomly divided into 3 groups comprising 11, 9, and 9 poults, respectively. These groups were caged in separate units and given free access to feed and water. The diet employed was a broiler feed of the formulation given in Example 1 to which had been added graded levels of 4(3H)-quinazolinone, 6,8-dichloro-3-[3-(3-hydroxy-2-piperidyl)-acetonyl]-, hydrochloride and 4(3H)-quinazolinone, 6,7-dichloro-3-[3-(3-hydroxy-2-piperidyl) acetonyl]-, hydrobromide. One day after presentation of the prescribed diets to the various groups, all poults were orally inoculated with about 500,000 sporulated oocysts of E. meleagrimitis. The inoculated birds were returned to their cages and the diet was continued for 9 days until the experiment was terminated. On termination, all birds were removed from their cages and weighed, and the weights were recorded.

The results of the test indicate that as little as 1.5 p.p.m. of the quinazolinone tested furnished substantial protection for the birds against the organism E. maleagrimitis. The results of the test are recorded in Table VIII below.

TABLE VIII.—E. MELEAGRIMITIS—PROPHYLACTIC

| Compound | Parts per million in diet | Number birds treated | Percent survival | Grams gained per bird 10 days |
|---|---|---|---|---|
| Infected | 0 | 11 | 91 | 396 |
| 4(3H)-quinazolinone, 6,8-dichloro-3-[3-(3-hydroxy-2-piperidyl)acetonyl]-, hydrochloride | 2 | 9 | 100 | 458 |
| 4(3H)-quinazolinone, 6,7-dichloro-3-[3-(3-hydroxy-2-piperidyl)acetonyl]-, hydrobromide | 1.5 | 9 | 100 | 481 |

Example 9.—Mixed coccidia infection of E. tenella and E. acervulina

A mixed inoculum of 5000 sporulated oocysts of E. acervulina and a sufficient number of oocysts of E. tenella to produce 85–100% mortality in untreated controls was given to seven-day-old chicks, similar to those described in previous tests. The chicks were given free access to feed and water during the entire test period. Two days after inoculation medicated feed, with several levels of drug or drugs, was presented to the various groups in test. Ten days after inoculation the tests were terminated, and the birds were weighed, necropsied and their intestinal tracts examined for lesions. The results of the tests appear in Table IX. These data show that mixtures of quinazolinones and a sulfonamide such as sulfaethoxypyridazine (i.e., 3-sulfanilamido-6-ethoxypyridazine) give complete protection against a mixed coccidia infection at relatively low levels. The data also show that the sulfonamide alone affords no protection against E. tenella lesions at any level used and that the addition of a sulfonamide to a feed medicated with a quinazolinone reduces the amount of said material necessary to achieve desired control.

TABLE IX

| Compound, p.p.m. in diet | Sulfaethoxy-pyridazine | Number of birds in test group | Number of survivors | Percent lesion E. tenella | Supression E. acerulina |
|---|---|---|---|---|---|
| 6,8-dichloro-3-[3-(3-hydroxy-2-piperidyl)-acetonyl]-4,(3H)-quinazolinone: | | | | | |
| 2 | 60 | 10 | 10 | 100 | 100 |
| 2 | 30 | 50 | 50 | 84 | 94 |
| 2 | 15 | 50 | 47 | 80 | 86 |
| 2 | 0 | 60 | 59 | 83 | 47 |
| 1.5 | 60 | 20 | 20 | 70 | 100 |
| 1.5 | 0 | 20 | 19 | 65 | 45 |
| 4 | 0 | 20 | 20 | 80 | 100 |
| 0 | 250 | 10 | 9 | 0 | 100 |
| 0 | 60 | 10 | 3 | 0 | 100 |
| 0 | 0 | 80 | 12 | 0 | 0 |
| 7,8-dichloro-3-[3-(3-hydroxy-2-piperidyl)-acetonyl]-,4(3H)-quinazolinone: | | | | | |
| 4 | 30 | 10 | 8 | 60 | 100 |
| 4 | 0 | 10 | 9 | 60 | 30 |
| 5 | 30 | 20 | 20 | 80 | 90 |
| 5 | 15 | 20 | 19 | 65 | 80 |
| 5 | 0 | 19 | 18 | 89 | 31 |
| 6 | 0 | 20 | 18 | 75 | 50 |
| 0 | 0 | 20 | 2 | 0 | 0 |

Example 10.—Preparation of allyl-2-(3-bromoacetonyl)-3-methoxy-1-piperidine carboxylate This compound is prepared by the method of B. R. Baker and F. J. McEvoy, J. Org. Chem. 20, 141 (1955), using 2-acetonyl-3-methoxypiperidine synthesized as described in the Barringer and Berkelhammer copending application filed concurrently herewith.

Example 11.—Preparation of 6,7,8-trichloro-4(3H)-quinazolinone 3,4,5-trichloroanthranilic acid (8.6 grams) and 6.3 grams of formamide are dissolved in 20 ml. of dimethylformamide. The solution is heated at reflux for 16 hours. The product crystallizes upon cooling, is collected by filtration, and washed with ethanol. Recrystallization from methyl Cellosolve gives 2.5 grams (30%) of yellow crystals, melting point 298–300°.

Example 12.—Preparation of 6,7,8-trichloro-3-[3-(1-allyloxycarbonyl - 3 - methoxy - 2 - piperidyl)acetonyl]-4(3H)-quinazolinone 6,7,8-trichloro-4(3H)-quinazolinone (1.5 grams) is partially dissolved in 7.3 ml. of 1.1 N sodium methoxide. To this is added 2.0 grams of allyl-2-(3-bromoacetonyl)-3-methoxyl-1-piperidine carboxylate dissolved in 18 ml. of methanol. The mixture is stirred at room temperature for 4 hours. The solvent is removed under reduced pressure and the residue slurried with water and extracted 3 times with chloroform. After drying, the chloroform extracts are evaporated under vacuum, yielding 2.7 grams (90%) of products as a viscous, amber oil.

Example 13.—Preparation of 6,7,8-trichloro-3-[3(3-hydroxy - 2 - piperidyl)acetonyl] - 4(3H) - quinazolinone hydrobromide The product from Example 12 is dissolved in 75 ml. of 48% hydrobromic acid and heated at reflux for 1 hour. The solution is evaporated under vacuum to dryness. The residue is heated for 30 minutes in refluxing 2β-ethanol (remains undissolved), then collected by filtration; yield 0.85 gram (29%) of crude product. Recrystallization from ethanol-water (activated charcoal) gives white crystals, melting point 239° dec.

Example 14.—Preparation of 7,8-dichloro-4(3H)-quinazolinone

The procedure of Example 11 is followed, using 41.85 grams of 3,4-dichloroanthranilic acid [P. W. Sadler and R. L. Warren, J. Am. Chem. Soc., 78, 1251 (1956)] and 36 grams of formamide in 100 ml. of dimethylformamide. The product is purified by recrystallization from dimethylformamide and washing with acetone. 20.4 grams (50%) of pale yellow crystals are obtained, melting point 287°.

Example 15.—Preparation of 7,8-dichloro-3-[3-(1-allyloxycarbonyl - 3 - methoxy - 2 - piperidyl)acetonyl]-4(3H)-quinazolinone The procedure of the twelfth example is followed, using 1.29 grams of 7,8-dichloro-4(3H)-quinazolinone and 2.0 grams of allyl-2-(3-bromoacetonyl)-3-methoxy-1-piperidine carboxylate. 2.4 grams (86%) of product is obtained as a viscous, amber oil.

Example 16.—Preparation of 7,8-dichloro-3-[3-(3-hydroxy - 2 - piperidyl)acetonyl] - 4(3H) - quinazolinone hydrobromide The product from Example 15 is hydrolyzed following the procedure of Example 13. In this reaction a homogeneous solution is formed when refluxing the residue with ethanol. The solution is evaporated under vacuum and the residue triturated with cold ethanol. The brown solid is collected by filtration, then recrystallized from ethanol-water (activated charcoal). 340 mg. of product is obtained as a while crystalline material, melting point 248° dec.

Example 17

The compounds listed below, previously known as the dihydrochloride salts, are herein prepared according to Examples 12 and 13:

6-chloro-3-[3-(3-hydroxy-2-piperidyl)acetonyl]-4(3H)-quinazolinone hydrobromide (melting point 240° dec.)

6-bromo-3-[3-(3-hydroxy-2-piperidyl)acetonyl]-4(3H)-quinazolinone hydrobromide (melting point 257° dec.)

Example 18

The following compounds, previously known as the dihydrochloride salts, are prepared as the doubly blocked condensation products as in Example 12. The allyloxycarbonyl blocking group is removed by heating the crude condensation product in 50 ml. of 6 N hydrochloric acid at steam-bath temperature for 1 hour and evaporating to dryness. The methyl ether is then hydrolyzed by treating this residue as in Example 13.

8-chloro-3-[3-(3-hydroxy-2-piperidyl)acetonyl]-4(3H)-quinazolinone hydrobromide (melting point 247° dec.)

6,7-dichloro-3-[3-(3-hydroxy-2-piperidyl)acetonyl]-4(3H)-quinazolinone hydrobromide (melting point 237° dec.)

6,8-dichloro-3-[3-(3-hydroxy-2-piperidyl)acetonyl]-4(3H)-quinazolinone hydrobromide (melting point 251° dec.).

Example 19

The free base of 6-chloro-3-[3-(3-hydroxy-2-piperidyl)-acetonyl]-4(3H)-quinazolinone, previously known as the dihydrochloride, is prepared by neutralizing the hydrobromide (prepared as in Example 17) with 1 N sodium hydroxide and extracting into chloroform. Evaporation of the chloroform leaves the free base as a white solid, melting point 176–177°.

Example 20.—Preparation of 6,7-dichloro-3-[3-(1-allyloxycarbonyl - 3 - methoxy - 2 - piperidyl)acetonyl]-4(3H)-quinazolinone The procedure of Example 12 is followed, using 1.29 grams of 6,7-dichloro-4(3H)-quinazoline [B. R. Baker et al., J. Org. Chem., 17, 149–56 (1952)] and 2.0 grams of allyl-2-(3-bromoacetonyl)-3-methoxy-1-piperidine carboxylate. 2.3 grams (82%) of a viscous oil is obtained which is chromatographically purified to yield a white crystalline product, melting point 101–102°.

Example 21.—Preparation of 6,7-dichloro-3-[3-(3-acetoxy-2-piperidyl)acetonyl]-4(3H)-quinazolinone Thionyl chloride (1 ml.) is added to 400 mg. of 6,7-dichloro - 3[3 - (3 - hydroxy - 2 - piperidyl)acetonyl]-4(3H)-quinazolinone hydrobromide suspended in a mixture of 1 ml. of acetic anhydride and 1 ml. of glacial acetic acid. A homogeneous solution is formed accompanied by vigorous evolution of sulfur dioxide. The white crystalline product precipitates upon standing, is removed by filtration, and is washed with ether. The ether-washed solid is dissolved in chloroform and the solution washed thoroughly with aqueous sodium carbonate. The chloroform layer is separated, dried, and evaporated under vacuum, yielding an oil which separates as a white crystalline solid (60 mg.) M.P. 150–151° after solution in refluxing hexane-acetone and cooling.

Example 22.—Preparation of 6,8-diiodo-3-[3-(1-allyloxycarbonyl - 3 - methoxy - 2 - piperidyl)acetonyl] - 4(3H) quinazolinone The procedure of Example 12 is followed, using 2.39 grams of 6.8-diiodo-4(3H) - quinazolinone [M. R. Subbaram, J. Madras Uni., 24B, 179–82 (1954); C. A. 50, 352*e* (1956)] and 2.0 grams allyl-2-(3-bromoacetonyl)-3-methoxy-1-piperidine carboxylate. In this reaction part of the product precipitates from the reaction mixture, is collected by filtration and recrystallized from ethanol yielding 1.23 grams of white crystals, melting point 154–156°. The remainder of the reaction mixture is worked up in the usual manner, yielding the usual viscous, oily product.

Example 23.—Preparation of 6,8-diiodo-3-[3-(3-hydroxy-2 - piperidyl)acetonyl] - 4(3H) - quinazolinone hydrobromide The product of Example 22 is hydrolyzed according to the procedure of Example 13. 250 mg. of white crystalline product is obtained, melting point 244° C. dec.

Example 24.—Preparation of 6-nitro-3-[3-(1-allyloxycarbonyl - 3 - methoxy - 2 - piperidyl)acetonyl] - 4(3H)-quinazolinone The procedure of Example 12 is followed, using 1.15 grams of 6-nitro-4(3H)-quinazolinone and 2.0 grams of allyl-2(3-bromoacetonyl)-3-methoxy-1-piperidine carboxylate, except that no excess sodium methoxide is added. The product is a viscous brown syrup.

Example 25.—Preparation of 6-nitro-3-[3-(3-hydroxy-2-piperidyl)acetonyl]-4(3H)-quinazolinone hydrochloride The product from Example 24 is hydrolyzed according to the procedure of Example 13. The residue remaining from the removal of the hydrobromic acid is treated with refluxing saturated ethanolic hydrochloric acid for 30 minutes and the resultant solid filtered off and dissolved in aqueous ethanol. The ethanolic solution is heated under reflux for 30 minutes, treated with decolorizing carbon, and filtered. Refrigeration of the filtrate gives 610 mg. of the hydrochloride salt as pale yellow crystals, melting point 215° dec.

Example 26.—Preparation of 6,8-dibromo-4(3H)-quinazolinone

The procedure of Example 11 is followed using 0.9 gram of formamide and 2.95 grams of 3,5-dibromoanthranilic acid in 10 cc. of dimethylformamide. The product is purified by slurrying in hot ethanol and filtered to give 2.45 grams (82%) of pale yellow needles, unmelted at 300°.

Example 27.—Preparation of 6,8-dibromo-3-[3-(1-allyloxycarbonyl - 3-methoxy-2-piperidyl)acetonyl]-4(3H)-quinazolinone The procedure of Example 12 is followed, using 1.82 grams of 6,8 - dibromo - 4(3H)-quinazolinone and 2.0 grams of allyl-2-(3-bromoacetonyl)-3-methoxy-1-piperidine carboxylate, except that no excess sodium methoxide is used. The product is a dark brown syrup.

Example 28.—Preparation of 6,8-dibromo-3-[3-(3-hydroxy - 2-piperidyl)acetonyl]-4(3H)-quinazolinone hydrobromide The product of Example 27 is heated under reflux with 30 cc. of 6 N hydrochloric acid for 1 hour and the solution evaporated to dryness. The residue is dissolved in 20 cc. of 48% hydrobromic acid and the solution heated under reflux for 30 minutes and evaporated to dryness. The brown residue is treated with boiling saturated ethanolic hydrochloric acid for 20 minutes, and the resulting solid collected by filtration. In order to insure complete removal of the methyl ether blocking group, the material is subject to rehydrolysis following the procedure of Example 13. 360 mg. of the crystalline hydrobromide is obtained, melting point 250° dec.

Example 29.—Preparation of 6-fluoro-4(3H)-quinazolinone

The procedure of Example 11 is followed, using 2 cc. of formamide and 1.1 grams of 5-fluoroanthranilic acid in 3 cc. of dimethylformamide. Recrystallization of the crude mass from 95% ethanol gives 550 mg. of colorless product, melting point 249–251°.

Example 30.—Preparation of 6-fluoro-3-[3-(1-allyloxycarbonyl - 3 - methoxy - 2-piperidyl)acetonyl]-4(3H)-quinazolinone The procedure of Example 12 is followed, using 0.55 gram of 6 - fluoro-4(3H)-quinazolinone and 1.47 grams of 2-(3-bromoacetonyl)-3-methoxy-1-piperidyl carboxylate, except that no excess sodium methoxide is added. The product is a brown viscous syrup.

Example 31.—Preparation of 6-fluoro-3-[3-(3-hydroxy-2-piperidyl)acetonyl]-4(3H) - quinazolinone hydrobromide The product of Example 30 is hydrolyzed following the procedure of Example 13. The brown solid is recrystallized from 99% ethanol (decolorizing carbon) to give 253 mg. of product, melting point 230° dec.

Example 32

The citrate salt of 6 - chloro-3-[3-(3-hydroxy-2-piperidyl)acetonyl]-4(3H)-quinazolinone is obtained by taking up the 336 mg. of the free base of this compound (see Example 19) in ethanol and adding an ethanolic solution of 192 mg. of citric acid. Evaporation of the solvent gives the white crystalline citrate.

Example 33.—Preparation of 8 - bromo-6-chloro-3-[3-(1-allyoxycarbonyl - 3 - methoxy-2-piperidyl)acetonly]-4 (3H)-quinazolinone The procedure of Example 12 is followed, using 3.1 grams of 8-bromo-6-chloro-4(3H)-quinazolinone and 4.0 grams of allyl - 2-(3-bromoacetonyl)-3-methoxy-1-piperidine carboxylate. The product is a viscous amber oil.

Example 34.—Preparation of 8 - bromo-6-chloro-3-[3-(3-hydroxy - 2 - piperidyl)acetonyl]-4(3H)-quinazolinone hydrobromide The product of Example 33 is hydrolyzed following the procedure of Example 13. A white crystalline product is obtained, melting point 250° dec.

Example 35.—Preparation of 6-bromo-8-chloro-3-[3-(1-allyloxycarbonyl - 3 - methoxy -2-piperidyl)acetonyl]-4(3H)-quinazolinone The procedure of Example 12 is followed, using 1.55 grams of 6-bromo-8-chloro-4(3H)-quinazolinone and 2.0 grams of allyl - 2-(3-bromoacetonyl)-3-methoxy-1-piperidine carboxylate. 2.5 grams (85%) of product is obtained as a viscous amber oil.

Example 36.—Preparation of 6-bromo-8-chloro-3-[3-(3 - hydroxy - 2 - piperidyl)acetonyl]-4(3H)-quinazolinone hydrobromide The product of Example 35 is hydrolyzed following the procedure of Example 13. 0.8 gram of crude product is obtained which recrystallizes from ethanol-water (activated charcoal) as a white crystalline material, melting point 251° dec.

Example 37.—Preparation of 6-bromo-7-chloro-4(3H)-quinazolinone 4-chloroanthranilic acid (17.2 grams) is dissolved in 100 ml. of p-dioxane. After heating the solution to 60°, 16 grams of bromine dissolved in 100 ml. of p-dioxane is slowly added with stirring. The product precipitates as a yellow solid. It is dissolved in base and reprecipitated with acid, then recrystallized from ethanol.

5.4 grams of this anthranilic acid is cyclized as in Example 11, using 25 ml. of formamide and 10 ml. of dimethylformamide. The product is purified by recrystallization from ethyl cellosolve and washing with ethanol. Light tan needles are obtained, melting point 290–95°.

Example 38.—Preparation of 6-bromo-7-chloro-3-[3-(1-allyloxycarbonyl - 3 - methoxy - 2 - piperidyl)acetonyl]-4(3H)quinazolinone The procedure of Example 12 is followed, using 1.55 grams of 6-bromo-7-chloro-4(3H)-quinazolinone and 2.0 grams of allyl - 2-(3-bromoacetonyl)-3-methoxy-1-piperidine carboxylate. The product is a viscous amber oil.

Example 39.—Preparation of 6-bromo-7-chloro-3-[3-(3-hydroxy - 2 - piperidyl)acetonyl]-4(3H)-quinazolinone hydrobromide The product of Example 38 is hydrolyzed following the procedure of Example 13. A white crystalline product is obtained, melting point 242° dec.

Example 40.—Preparation of 7-bromo-6-chloro-4(3H)-quinazolinone 6-bromoisatin (12.0 grams) is dissolved in 300 ml. of glacial acetic acid, heated to 80°, and 10 ml. of sulfuryl chloride added. After 30 minutes the solution is cooled to 20°, causing 7.2 grams (55%) of 6-bromo-5-chloroisatin to separate as deep red crystals, melting point 284-285°. The isatin is oxidized with 30% hydrogen peroxide in N NaOH giving 5.8 grams (84%) of 5-bromo-4-chloroanthranilic acid as tan crystals, melting point 251–252°.

5.0 grams of this anthranilic acid is cyclized as in Example 11 using 10 ml. of formamide and 10 ml. of dimethylformamide. The addition of 150 ml. of ethanol to the reaction mixture causes the separation of 3.2 grams (60%) of tan crystalline product, melting point >290°.

Example 41.—Preparation of 7-bromo-6-chloro-3-[3-(1-allyloxycarbonyl - 3 - methoxy - 2 - piperidyl)acetonyl]-4(3H)-quinazolinone The procedure of Example 12 is followed using 2.95 grams of 7-bromo-6-chloro-4(3H)-quinazolinone and 3.34 grams of allyl - 2-(3-bromoacetonyl)-3-methoxy-1-piperidine carboxylate. The product is a brown syrup.

Example 42.—Preparation of 7-bromo-6-chloro-3-[3-(3-hydroxy - 2 - piperidyl)acetonyl]-4(3H)-quinazolinone hydrobromide The product of Example 41 is hydrolyzed following the procedure of Example 13. 410 mg. of tan crystalline product is obtained, melting point 247° dec.

Example 43.—Preparation of 6,7-dibromo-4(3H)-quinazolinone 4.0 grams of 4,5-dibromoanthranilic acid is cyclized as in Example 11 using 4 ml. of formamide and 8 ml. of dimethyl formamide. Recrystallization from ethanol-dimethylformamide (10:1) gives 3.9 grams of tan crystals, melting point >310°.

Example 44.—Preparation of 6,7-dibromo-3-[3-(1-allyloxycarbonyl - 3-methoxy-2-piperidyl)acetonyl]-4(3H)-quinazolinone The procedure of Example 12 is followed using 2.3 grams of 6,7-dibromo-4(3H)-quinazolinone and 5.0 grams of allyl-2-(3-bromoacetonyl)-3-methoxy-1-piperidine carboxylate. The product is a dark brown syrup.

Example 45.—Preparation of 6,7-dibromo - 3 - [3-(3-hydroxy - 2-piperidyl)acetonyl]-4(3H)-quinazolinone hydrobromide The product of Example 44 is hydrolyzed following the procedure of Example 13. Recrystallization from ethanol water (activated charcoal), gives 920 mg. of white crystals, melting point 250° dec.

Example 46

The nitrate salt of 6,8 - dichloro-3-[3-(3-hydroxy-2-piperidyl)acetonyl]-4-(3H)-quinazolinone is obtained by taking up 50 mg. of the hydrobromide salt of this compound in 5 ml. of water and adding 3.0 grams of solid sodium nitrate with warming. After 48 hours at 25° a white microcrystalline product is obtained, melting point 235° dec.

Example 47.—Preparation of 6-chloro-7-fluoro-4-(3H)-quinazolinone 6-fluoroisatin (16.5 g.) is stirred with 250 ml. of glacial acetic acid at 90° and 13.5 g. of sulfuryl chloride added dropwise over 12 minutes. The deep red reaction mixture is heated under reflux for 2 hours and then cooled giving 12.6 g. of 5-chloro-6-fluoroisatin as an orange solid, melting point 239–242°. The isatin (10 g.) in 150 ml. of N sodium hydroxide is oxidized with 20 ml. of 30% hydrogen peroxide giving 5.9 g. of 5-chloro-4-fluoroanthranilic acid. 4.75 g. of this anthranilic acid is cyclized as in Example 11 using 6 ml. of formamide and 3 ml. of dimethylformamide. Removal of the solvents under vacuum gives a gum which upon treatment with water becomes an off-white solid, melting point greater than 300°.

Example 48.—Preparation of 6-chloro-7-fluoro-3-[3-(1-allyloxycarbonyl - 3 - methoxy - 2 - piperidyl)acetonyl]-4(3H)-quinazolinone The procedure of Example 12 is followed with 4.96 g. of 6-chloro-7-fluoro-4(3H)-quinazolinone and 12.53 g. of allyl-2-(3-bromoacetonyl)-3-methoxy-1-piperidine carboxylate. The product is a dark brown syrup.

Example 49.—Preparation of 6-chloro-7-fluoro-3-[3-(3-hydroxy - 2 - piperidyl)acetonyl]-4(3H)-quinazolinone hydrobromide The product of Example 48 is hydrolyzed according to the procedure of Example 13. Evaporation of the hydrobromic acid leaves a residue from which 1.75 g. of brown solid is obtained after several treatments with boiling absolute alcohol. Recrystallization from alcohol-water gives 650 mg. of solid, melting point 237° dec.

We claim:

1. A method of controlling coccidiosis in animals comprising orally administering to domestic animals an edible carrier containing an effective amount of an anticoccidial of the formula:

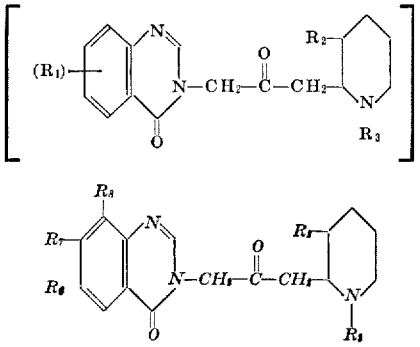

*wherein each of $R_6$, $R_7$ and $R_8$ is individually selected from the group consisting of hydrogen, halogen, nitro, lower alkyl, phenyl and lower alkoxy, and $R_6$ and $R_7$ or $R_7$ and $R_8$, taken together, may form a benzo moiety,* [wherein $R_1$ is a member of the group consisting of hydrogen, halogen, nitro, benzo, lower alkyl, phenyl, and lower alkoxy,] $R_2$ is a member of the group consisting of hydroxy, acetoxy, and lower alkoxy, and $R_3$ is a member of the group consisting of hydrogen and lower alkenoxy-carbonyl, and the physiologically acceptable salts thereof.

2. A method according to claim 1 in which the quinazolinone is present to the extent of between about 0.5 and 10 parts per million and the edible carrier is an animal feed.

3. A method according to claim 1 in which the compound is 6-chloro-7-fluoro-3-[3-(3-hydroxy-2-piperidyl)-acetonyl]-4(3H)-quinazolinone hydrobromide.

4. A method according to claim 1 in which the compound is 6,8-dichloro-3-[3-(3-hydroxy-2-piperidyl)-acetonyl]-4(3H)-quinazolinone hydrochloride.

5. A method according to claim 1 in which the compound is 6-phenyl-3-[3-(3-hydroxy-2-piperidyl)acetonyl]-4(3H)-quinazolinone dihydrochloride.

6. A method according to claim 1 in which the compound is 6,7-dichloro-3-[3-(3-hydroxy-2-piperidyl)-acetonyl]-4(3H)-quinazolinone hydrobromide.

7. A method according to claim 1 in which the compound is 6-chloro-3-[3-(3-hydroxy-2-piperidyl)acetonyl]-4(3H)-quinazolinone.

8. A method according to claim 1 in which the compound is 6-chloro-3-[3-(3-hydroxy-2-piperidyl)acetonyl]-4(3H)-quinazolinone hydrobromide.

9. A method according to claim 1 in which the compound is 6-chloro-3-[3-(3-hydroxy-2-piperidyl)acetonyl]-4(3H)-quinazolinone citrate.

10. A method according to claim 1 in which the compound is 6-nitro-3-[3-(3-hydroxy-2-piperidyl)acetonyl]-4(3H)-quinazolinone hydrochloride.

11. A method according to claim 1 in which the compound is 6,7,8 - trichloro - 3 - [3 - (3 - hydroxy - 2 - piperidyl)-acetonyl]-4(3H)-quinazolinone hydrobromide.

12. A method according to claim 1 in which the compound is 7,8-dichloro-3-[3-(3-hydroxy-2-piperidyl)-acetonyl]-4(3H)-quinazolinone hydrobromide.

13. A method according to claim 1 in which the compound is 8-chloro-3-[3-(3-hydroxy-2-piperidyl)acetonyl]-4(3H)-quinazolinone hydrobromide.

14. A method according to claim 1 in which the compound is 6,8-dichloro-3-[3-(3-hydroxy-2-piperidyl)acetonyl]-4(3H)-quinazolinone hydrobromide.

15. A method according to claim 1 in which the compound is 6,8-dibromo-3-[3-(3-hydroxy-2-piperidyl)-acetonyl]-4(3H)-quinazolinone dihydrochloride.

16. A method according to claim 1 in which the compound is 6-methyl-7-chloro-3-[3-(3-hydroxy-2-piperidyl)-acetonyl]-4(3H)-quinazolinone dihydrochloride.

17. A method according to claim 1 in which the compound is 6-methyl-7-chloro-3-[3-(3-hydroxy-2-piperidyl)-acetonyl]-4(3H)-quinazolinone dihydrochloride.

18. A method according to claim 1 in which the compound is 7-bromo-6-chloro-3-[3-(3-hydroxy-2-piperidyl)-acetonyl]-4(3H)-quinazolinone hydrobromide.

19. A method according to claim 1 in which the compound is 6-bromo-8-chloro-3-[3-(3-hydroxy-2-piperidyl)-acetonyl]-4(3H)-quinazolinone hydrobromide.

20. A method according to claim 1 in which the compound is 6,7-dibromo-3-[3-(3-hydroxy-2-piperidyl)acetonyl]-4(3H)-quinazolinone hydrobromide.

The following references, cited by the Examiner, are of record in the patented file of this patent or the original patent.

FOREIGN PATENTS 159,703 9/1951 Australia.

ALBERT T. MEYERS, Primary Examiner

HOWARD M. ELLIS, Assistant Examiner

U.S. Cl. X.R.

424—229